(12) United States Patent
Pai

(10) Patent No.: US 9,830,799 B2
(45) Date of Patent: Nov. 28, 2017

(54) LOCATING AN ELECTRONIC DEVICE

(71) Applicant: Microsoft Technology Licensing, LLC, Redmond, WA (US)

(72) Inventor: Mahesh M. Pai, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/014,676

(22) Filed: Feb. 3, 2016

(65) Prior Publication Data

US 2017/0221341 A1  Aug. 3, 2017

(51) Int. Cl.
*H04Q 5/22* (2006.01)
*G08B 21/24* (2006.01)

(52) U.S. Cl.
CPC .................... *G08B 21/24* (2013.01)

(58) Field of Classification Search
CPC ...................................... G08B 21/24
USPC ..... 340/8.1, 539.13, 539.32, 686.6; 701/408, 701/519; 455/41.2, 412.2, 456.1, 456.6; 375/136, 137; 370/311, 328, 336, 338
See application file for complete search history.

(56) References Cited

U.S. PATENT DOCUMENTS

| | | | |
|---|---|---|---|
| 8,307,231 B2 | 11/2012 | Radulescu et al. | |
| 8,326,315 B2 * | 12/2012 | Phillips .............. | G08B 21/0236 348/552 |
| 8,830,889 B2 | 9/2014 | Woo et al. | |
| 8,847,754 B2 | 9/2014 | Buchheim et al. | |
| 8,964,640 B2 | 2/2015 | Ko et al. | |
| 8,965,284 B2 | 2/2015 | Honkanen et al. | |
| 9,063,212 B2 | 6/2015 | Jones | |
| 9,532,312 B1 | 12/2016 | Kim et al. | |

(Continued)

FOREIGN PATENT DOCUMENTS

| | | |
|---|---|---|
| WO | 0158098 A2 | 8/2001 |
| WO | 2015052611 A1 | 4/2015 |

(Continued)

OTHER PUBLICATIONS

"Find your Phone, Keys, Anything", Retrieved on: Nov. 2, 2015 Available at: https://www.thetileapp.com/#this-is-tile.

(Continued)

*Primary Examiner* — Dhaval Patel
(74) *Attorney, Agent, or Firm* — Lempia Summerfield Katz LLC

(57) ABSTRACT

Devices, systems, and methods of locating a misplaced electronic device using a mobile computer are disclosed herein. In certain examples, the misplaced device is configured to transmit a first plurality of beacons at a first rate, operate in a receive mode between at least one pair of adjacent beacons, receive a wake-up message from the mobile computer over a wireless communication network during the operation in the receive mode, and transmit a second plurality of beacons following receipt of the wake-up message, wherein each beacon in the second plurality of beacons is transmitted at a second rate, the second rate being faster than the first rate. The mobile computing device is configured to receive the first plurality of beacons from the misplaced electronic device, transmit the wake-up message, and receive the second plurality of beacon signals in order to assist in locating the misplaced device.

21 Claims, 4 Drawing Sheets

(56) References Cited

U.S. PATENT DOCUMENTS

| | | |
|---|---|---|
| 2011/0050412 A1 | 3/2011 | Wittman et al. |
| 2012/0214417 A1* | 8/2012 | Woo ...................... G06F 1/3209 |
| | | 455/41.2 |
| 2014/0143060 A1* | 5/2014 | Fernandez ......... G06Q 30/0281 |
| | | 705/14.58 |
| 2014/0220883 A1 | 8/2014 | Emigh et al. |
| 2014/0228044 A1* | 8/2014 | Jones, Jr. .............. G01S 5/0226 |
| | | 455/456.1 |
| 2014/0274127 A1 | 9/2014 | Beidel |
| 2014/0370917 A1 | 12/2014 | Buchheim et al. |
| 2015/0015442 A1 | 1/2015 | Kolb et al. |
| 2016/0094598 A1* | 3/2016 | Gedikian .............. H04W 4/021 |
| | | 455/456.3 |
| 2016/0202758 A1* | 7/2016 | Peana ..................... G06F 3/013 |
| | | 345/601 |

FOREIGN PATENT DOCUMENTS

| | | | |
|---|---|---|---|
| WO | 2015069024 A1 | 5/2015 | |
| WO | 2017040690 A1 | 3/2017 | |

OTHER PUBLICATIONS

"Never Lose Your Belongings Again!", Published Date: May 17, 2014 Available at: http://findemtracking.com/.

"Flic", Retrieved on: Nov. 2, 2015 Available at: https://flic.io/.

"International Search Report and Written Opinion Issued in PCT Application No. PCT/US2017/013688", dated Apr. 6, 2017, 12 Pages.

* cited by examiner

LOCATING AN ELECTRONIC DEVICE

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
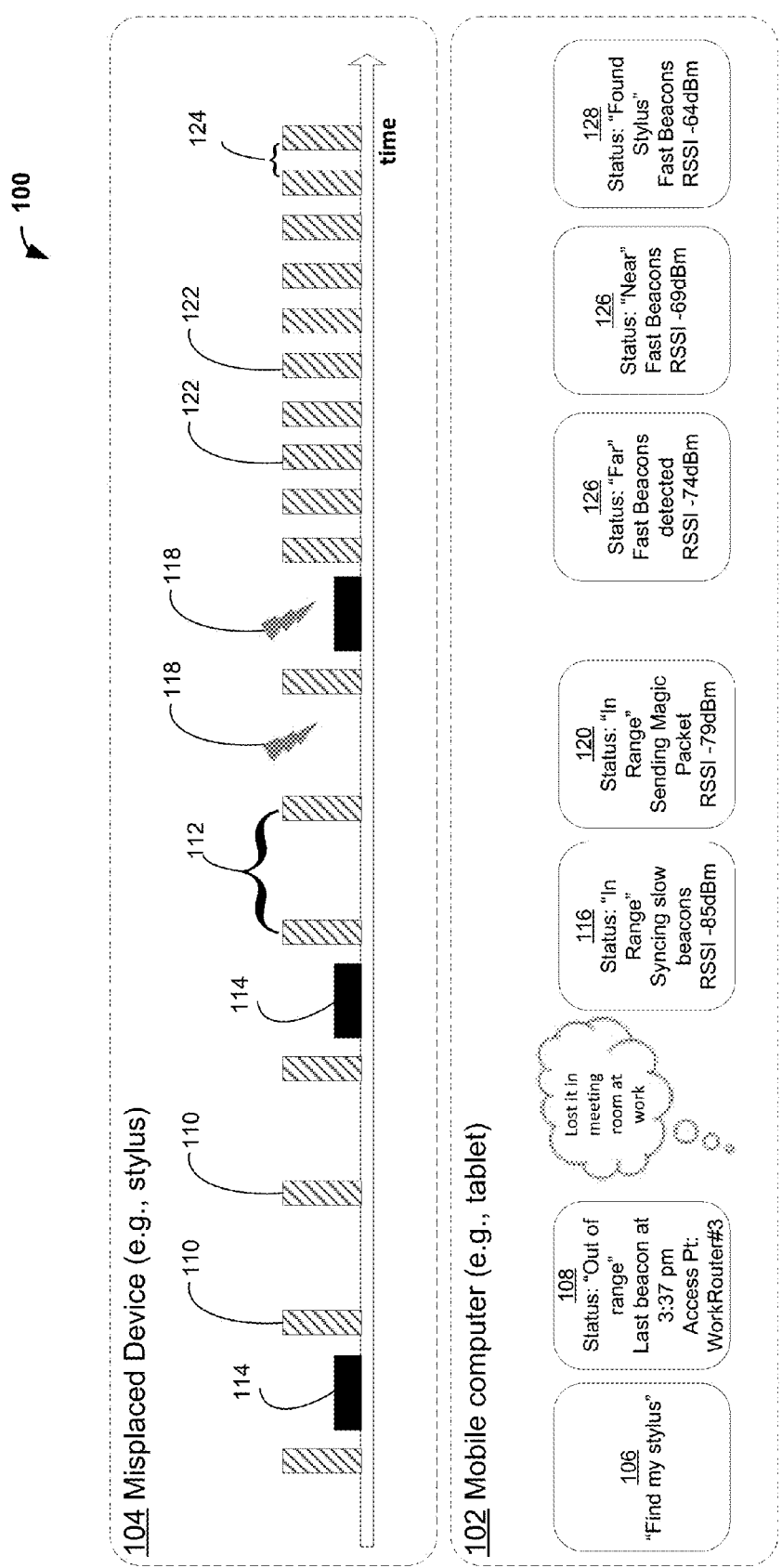
FIG. 1 depicts an example of an interaction between a misplaced electronic device and a mobile computing device used to discover the misplaced electronic device.

While the disclosed devices, systems, and methods are susceptible of embodiments in various forms, specific embodiments are illustrated in the drawing (and are hereafter described), with the understanding that the disclosure is intended to be illustrative, and is not intended to limit the claim scope to the specific embodiments described and illustrated herein.

DETAILED DESCRIPTION

A pair of wirelessly connected electronic devices may become separated from each other at some time during the lifespans. In certain instances, one of the devices is lost or misplaced by an operator of the device. The operator may use the other electronic device may be used to locate the misplaced device.

Disclosed herein are devices, systems, and methods of locating or recovering a misplaced electronic device using a mobile computing device. Specifically, the devices, systems, and methods include the use of hybrid beaconing in the recovery of the misplaced electronic device. Such hybrid beaconing provides improvements in the power usage of the misplaced electronic device, while still providing adequate assistance in locating the device. This is advantageous, as the hybrid beaconing may provide no noticeable impact on the overall battery life of the misplaced electronic device. Alternatively, in some instances, hybrid beaconing may provide improved battery life in comparison with a similar electronic device beaconing at a fixed rate. Further, the hybrid beaconing may provide for an improved user experience in locating or recovering the misplaced electronic device.

Such hybrid beaconing features may be used in any system having at least two connectable or pairable electronic devices, where it may be beneficial to reduce power consumption and save battery life for one of the devices when the device becomes inactive or separated from its connectable device (e.g., a tablet computer and a connectable electronic stylus or pen). For example, the system having the two electronic devices may be useful in mobile phone applications, gaming applications, smart home applications, wearable applications, automotive applications, personal computer applications, security applications, proximity applications, healthcare applications, sports and fitness applications, or industrial applications.

In one non-limiting example, the system includes a tablet computer and an electronic stylus (e.g., pen) paired with the tablet computer or mobile phone. It is likely at some time that the pen may be separated from its paired tablet computer. In the examples disclosed herein, the pen may transmit two different sets of beacons. That is, a first set of beacons may be transmitted at a first rate (e.g., low duty cycle) when the pen is misplaced or disconnected from the tablet computer. When the tablet computer narrows in on the location of the pen, a second set of beacons may be transmitted at a second, faster rate (e.g., high duty cycle) to assist in discovery of the device. In such an example, the stylus may be readily discovered using less battery power than a similar device without hybrid beaconing (i.e., always beaconing at the second, faster rate), while providing a good user experience in discovering the misplaced stylus through the faster beaconing when in range of the misplaced stylus.

These features, and others, are discussed in greater detail below with reference to the examples and figures below.

Definitions

As used herein, "hybrid beaconing" may refer to an electronic device configured to transmit a first plurality of beacons at a different rate or interval of time from a second plurality of beacons. For example, an electronic device, while disconnected, misplaced, or in an idle state, may transmit beacons at a first rate or interval of time that is slower than a second rate or interval of time when the electronic device is actively being used or within range of or connected to a separate computing device. This is advantageous, as less battery power is consumed when the device is disconnected, misplaced, or idle. Additionally, this is advantageous as the second, faster beaconing rate provides for an improved user experience in discovering the misplaced device after connecting with the misplaced device over a wireless network (e.g., a Bluetooth low energy network).

As used herein, a "beacon" may refer to a wireless data transmission that may include or be interpreted to include the proximity or location of an electronic device. In some examples, a beacon may include information such as a timestamp, received signal strength indicator (RSSI), or location information (e.g., an access point or global positioning coordinates). Such information may be provided in a Bluetooth Smart packet to provide a unique identifier.

As used herein, a "mobile computing device" or "mobile computer" refers to any electronic device capable of being transported from one location to another. In some examples, the mobile computer is a tablet computer, a mobile phone, a music device, a handheld gaming device, a navigation device, or a wearable electronic device. The mobile computing device is configured to wirelessly connect or pair with additional electronic device over a communication network.

As used herein, a "paired electronic device" or "pairable electronic device" may refer to any electronic device capable of being wirelessly connected to the mobile computer via a communication network. In some examples, the electronic device is a peripheral device of the mobile computer, such as a mouse, keyboard, barcode reader, image scanner, microphone, webcam, game controller, stylus, or camera. In other examples, the electronic device is a sport or fitness electronic accessory such as a body composition analysis device, heart rate monitor, running or cycling speed/cadence monitor, weight scale device, or athletic equipment (e.g., ball, racquet, bat, glove, water bottle). In other examples, the pairable device may be any mobile device of interest to be monitored or tracked. For instance, wearable devices, car keys, house keys, children's toys, or even paper documents may be configured as an electronic device having an integrated circuit. Such a device may be embedded with an integrated circuit and wirelessly connected with the mobile computer to keep track of the device.

As used herein, a "wearable electronic device" may refer to an electronic device that may be worn on or attached to a person's body or clothing. The device may be attached to a person's shirt or jacket; worn on a person's wrist, ankle, waist, or head; worn over their eyes or ears; or attached to the person's body as a prosthetic. Such wearable electronic devices may include a watch, heart-rate monitor, activity tracker, head-mounted display, or prosthetic arm or leg. In some examples, the wearable electronic device is an article of clothing embedded with an integrated circuit. The article of clothing may be, for example, a hat, gloves, a scarf, socks, shoes, pants, a shirt, or a jacket.

As used herein, a "communication network" may refer to any wireless communication path between the connected electronic devices. In certain examples, the communication network may be a personal area network (PAN), a near-me area network (NAN), or a local area network (LAN). In some examples, the communication network includes communication via radio wave frequencies. In one particular example, the communication network includes Bluetooth low energy (BLE) technology or a comparable technology configured to transmit small packets of information (as compared with Bluetooth Classic technology). Such technology is advantageous as it may allow for low power consumption and extended battery life of the device (e.g., a 1000 mAh coin cell battery may be capable of functioning for 1-2 years with typical use before battery replacement).

As used herein, a "wake-up message" may refer to a wirelessly transmitted data packet of information sent by one electronic device, wherein the message is configured to wake-up or power on a connected electronic device. In some examples, the wake-up message is referred to as a "magic packet." The connected device that is woken may be configured to listen for incoming packets in a low-power mode. When the magic packet or wake-up message is received, a transmission signal within the packet or message may be configured to initiate a system wake-up.

Exemplary Configurations of Electronic Devices and Systems

FIG. 1 depicts a timeline of events 100 for a system having two electronic devices: a mobile computer 102 and a pairable electronic device 104. The mobile computer 102 may be any electronic device capable of being transported from one location to another, as defined above, such as a tablet computer, a mobile phone, a music device, a handheld gaming device, a navigation device, or a wearable electronic device. In one particular example, the mobile computer 102 is a tablet computer. In another example, the mobile computer 102 is a mobile phone.

The mobile computer 102 is wirelessly connectable or pairable with the electronic device 104. The electronic device 104 may be any electronic device capable of being wirelessly connected to the mobile computer 102 via a wireless communication network. In one particular example, the paired electronic device 104 may be a stylus or pen configured to interact with a display screen of the mobile computer 102. In another example, the paired electronic device 104 may be a wearable electronic device. In yet another example, the paired electronic device 104 may be a house or car key.

The wireless connection may be any wireless communication network connection, as defined above. In one particular example, the communication network is a Bluetooth low energy network.

In the timeline of events depicted in FIG. 1, the electronic device 104 has been misplaced, and the mobile computer 102 is used in order to locate and recover the misplaced electronic device 104. The process may commence with a user of the mobile computer 102 (e.g., a tablet computer) realizing that the paired electronic device 104 (e.g., a stylus or pen) is missing. The user may operate the mobile computer 102 to find the misplaced paired electronic device 104. This inquiry may be a physical operation, such as the user opening an application or typing in a command 106 on the mobile computer 102 to search for the misplaced device 104. Alternatively, the user may speak the command 106 to the mobile computer requesting assistance in finding the misplaced device 104 (e.g., "Where is my pen?").

In other examples, the user may have been alerted that the electronic device 104 has been disconnected or is potentially about to be disconnected from the mobile computer 102. This may be based on the most recently received beacon transmission and certain information within the transmission indicating the connection strength is low or distance between the two components has exceeded or is about to exceed a predefined threshold level (e.g., 50 meters, 100 meters, 200 meters). In other words, the mobile computing device 102 may receive a beacon signal having a received signal strength indicator, identify that the received signal strength is low, and then provide an alert or notification that the signal strength is low, potentially prior to a loss of connection or shortly following a loss of connection. The alert or notification may be an audio transmission over a speaker of the mobile computing device and/or a visual message on a display screen of the device indicating the status. This may prompt the user to inquire into the location of the misplaced device immediately, or avoid misplacing the device.

Following an inquiry by the user into the whereabouts of the misplaced electronic device 104, an indication may be provided on a display screen of the mobile computer 102 representing a last received beacon 108 from the misplaced device 104. For example, the misplaced electronic device 104, prior to becoming disconnected or misplaced from the mobile computer 102, may transmit beacons to the mobile computer 102. The beacon 108 may include information such as a timestamp of when the beacon was transmitted, a received signal strength indicator (RSSI) of the connection between the two devices, and/or location information of the misplaced electronic device. For example, the location information may include wireless access point (WAP) information (e.g., the network router that the device is connected to when transmitting the beacon). Alternatively, the location information may include global positioning coordinates of the device at the time of transmission.

The timestamp and location information may be helpful in tracking down the location of the misplaced device. For example, a timestamp of the last received beacon 108 may have been transmitted that same day at 3:37 pm. The user may remember being in a conference room meeting at that time, and return to that location to look for the device. Additionally, or alternatively, access point or GPS information may be useful in reminding a user what network router the misplaced device was connected with at the time of the last transmitted beacon. For example, the access point may be the user's home network; reminding the user that he or she misplaced the electronic device 104 at home (and not at work).

In certain examples, once a new beacon is received, the previously received beacon may be discarded, such that only the last received beacon 108 is saved. This may be advantageous as minimal memory is used on the mobile computer 102 to store the beacon information. Alternatively, the mobile computer 102 may store a plurality of beacons (e.g., the last 5 received beacons).

In certain examples, such as when the paired electronic device 104 is misplaced, the device may operate in a low-power mode to save battery life while still attempting to be discovered by the mobile computer 102. For example, the misplaced electronic device 104 may transmit a first plurality of beacons 110 at a first rate or interval of time 112 in an effort to connect with the mobile computer 102. Each beacon in the first plurality of beacons 110 may include certain information, like a timestamp or status information (e.g., "out of range," "battery is dying," "battery is at X %," and so on).

The interval of time 112 between beacons and the length of time of each beacon is configurable based on certain characteristics of the electronic device 104. For example, the battery capacity and/or the battery power remaining may determine the frequency of beaconing or length of beaconing. In some examples, the frequency or interval of time 112 between beacons is in a range of 1-120 seconds, 5-60 seconds, 10-60 seconds, 10-30 seconds, or 10-20 seconds. In certain examples, the length of each beacon may be in a range of 0.01-100 milliseconds (ms), 0.1-10 ms, 0.1-5 ms, or 1-5 ms.

In some instances, the interval of time 112 between beacons and/or the length of time of each beacon may be programmably adjustable during operation of the electronic device 104. For instance, as the device's estimated battery life drops below a threshold level (e.g., 20%, 10%, 5%, 1%), the beaconing interval may be extended and/or the duration reduced in order to conserve battery power.

Further, the misplaced electronic device 104 may operate in a listening or receive mode 114 between certain pairs of adjacent beacons within the first plurality of beacons in an effort to listen for and receive a message from the paired mobile computing device 102. In some examples, the misplaced electronic device 104 operates in the listening or receive mode 114 between each beacon transmission. In other examples, the misplaced electronic device 104 operates in the listening or receive mode 114 between less than every pair of adjacent beacons to reduce power consumption and save battery life (e.g., the receive mode may operate between every second pair of adjacent beacons, every third pair, every fourth pair, and so on). Like the beaconing, the interval of time between operating in receive mode and the length of each receive mode operation is configurable based on certain characteristics of the electronic device 104. For example, the battery capacity and/or the battery power remaining may determine the frequency of receive mode operations or length of time operating in the receive mode. In some examples, the frequency or interval of time between receive mode operations is in a range of 1-120 seconds, 5-120 seconds, 10-60 seconds, 20-60 seconds, or 20-40 seconds. In certain examples, the length of each receive mode may be in a range of 0.1 ms-1 second, 1-100 ms, 1-50 ms, or 5-20 ms.

Like the first plurality of beacons, in some instances, the interval of time between receive mode operations and/or the length of time of each receive mode may be programmably adjustable during operation of the electronic device 104. For instance, as the device's estimated battery life drops below a threshold level (e.g., 20%, 10%, 5%, 1%), the receive mode interval may be extended and/or the duration reduced in order to conserve battery power. In alternative examples, the receive mode may be turned off entirely to extend the battery life.

The misplaced electronic device 104 may become discoverable based upon the last received beacon 108 and the transmission of the first plurality of beacons 110. For instance, the last received beacon 108 may be useful in directing the user and mobile computer 102 to a range or vicinity of the misplaced device 104.

After the mobile computer 102 has entered within a defined range or vicinity of the misplaced device 104 (e.g., 100 meters, 50 meters, 20 meters, 10 meters), the mobile computer 102 may be able to receive the beacons 110 from the misplaced device 104 over the communication network (e.g., a Bluetooth low energy network). A notification 116 may be provided (e.g., a sound or visual message on a display screen) by the mobile computer 102 identifying that the misplaced device 104 is connected. The notification 116 may include a status update stating that the misplaced device 104 is in range. Additionally, or alternatively, the notification may include the received signal strength indicator between the two devices (providing some guidance as to the relative distance to the misplaced device).

In some instances, the misplaced device 104 may be connected with the mobile computer 102 on the communication network, but still remain undiscovered by the user (e.g., the stylus may be in a different room or within a drawer or under a stack of paper in the room).

Upon receipt of the first plurality of beacons 110 over the connected wireless communication network, the mobile computer 102 may synchronize with the misplaced device 104 based on the timing of the beacon 110 transmissions. In this synchronization, the mobile computer 102 may identify the timing of each received beacon from the misplaced device 104. Using this timing information, the mobile computer 102 may determine when to transmit a message to the misplaced device 104 such that the message is sent at a different time than a transmitted beacon 110 by the misplaced device 104 (i.e., such that the message from the mobile computer 102 is sent at a time between adjacent beacons when the misplaced device 104 may be operating in a listening or receive mode).

Upon synchronization, the mobile computer 102 may transmit at least one wake-up message 118 or magic packet of information to the misplaced device 104 at a time between the beacon transmissions 110. In certain examples, more than one wake-up message 118 is transmitted before the misplaced device 104 receives a wake-up message. That is, the misplaced device 104 may not be operating in a listening or receive mode 114 at the time a wake-up message 118 is transmitted. An additional notification 120 may be provided (e.g., a sound or visual message on a display screen) by the mobile computer 102 identifying that a magic packet has been sent to the misplaced device 104. The notification 120 may additionally, or alternatively, include the notification may include the received signal strength indicator between the two devices.

Following receipt of the wake-up message 118, the misplaced electronic device 104 may wake-up from a low-power mode in an effort to be discovered. The misplaced device 104 may then transmit a second plurality of beacons 122 at a second rate or interval of time 124. Like the first plurality of beacons, the interval of time 124 between beacons and the length of time of each beacon in the second plurality of beacons 122 is configurable based on certain characteristics of the electronic device 104. In these examples, the second interval 124 is less than the first interval 112 (i.e., the beaconing becomes more rapid as the misplaced device 104 is within range of being discovered). As previously noted, this hybrid beaconing is advantageous as the rapid beaconing is limited to situations where the device is within a defined range of being discovered (e.g., connected on Bluetooth network). In other words, an improved user experience in discovering the misplaced device is provided through the faster beaconing only when the mobile computer 102 is within a certain range and has connected with the misplaced device 104 over a wireless communication network (e.g., a Bluetooth low energy network).

In some examples, the battery capacity and/or the battery power remaining may determine the frequency of beaconing or length of beaconing. In certain examples, the frequency or interval of time 124 between beacons in the second plurality of beacons is in a range of 0.01-60 seconds, 0.1-10 seconds, 1-5 seconds, or 1-2 seconds (wherein the interval of time 124 is less than the interval of time for the first plurality of beacons). In certain examples, the length of each beacon may be in a range of 0.01-100 ms, 0.1-10 ms, 0.1-5 ms, or 1-5 ms.

Like the first plurality of beacons, in some instances, the interval of time 124 and/or the length of time of each beacon in the second plurality of beacons 122 may be programmably adjustable during operation of the electronic device 104. For instance, as the device's estimated battery life drops below a threshold level (e.g., 20%, 10%, 5%, 1%), the interval of time between beacons may be extended and/or the duration of each beacon reduced in order to conserve battery power.

Beacons 122 received by the mobile computer 102 may be analyzed and notifications 126 may be displayed on a display screen of the mobile computer 102, or audio signal may be provided to define the relative distance of how close the two devices are from each other. For example, a notification 126 may include information providing a relative distance from discovery (e.g., a low RSSI or distance greater than 50 meters="Far"; an intermediate RSSI or distance between 1-50 meters="Near"; a strong RSSI or a distance of less than 1 meter="Found Device"). This may alternatively be provided in terms of beeping sounds (e.g., like a metal detector), wherein faster beeping indicates a closer proximity to the misplaced device. Additionally, or alternatively, the notifications 126 on a display screen of the mobile computer 102 may include a received signal strength indicator between the two devices. Also, the notifications 126 may include information acknowledging the receipt of the second plurality of faster beacons 122 from the misplaced device 104.

In some examples, after the misplaced device 104 is discovered, the second plurality of beacons 122 stops automatically, and normal operation of the paired devices commences. In other examples, the faster beaconing stops after the user stops an application on the mobile computer 102 (e.g., verbally instructs the search to conclude or physically closes an application on the device). A notification 128 may also be provided indicating that the misplaced device has been located.

In an alternative example, such as when the estimated battery life of the misplaced device 104 drops below a threshold level (e.g., 20%, 10%, 5%, 1%), the receive mode may be turned off entirely to extend the battery life of the device. In such an example, the misplaced device 104 does not receive the magic packet sent by the mobile computer 102. The mobile computer 102 identifies that the magic packets are ignored despite detecting stronger beacons from the misplaced device 104. As such, the mobile computer 102 and the user of the mobile computer may continue to track and discover the misplaced device based upon the receipt of the slow beacons (e.g., the first plurality of beacons). This is a fallback position to save battery life, albeit with potentially reduced responsiveness.

Exemplary Method of Reconnecting a Misplaced Electronic Device

Figure 2:
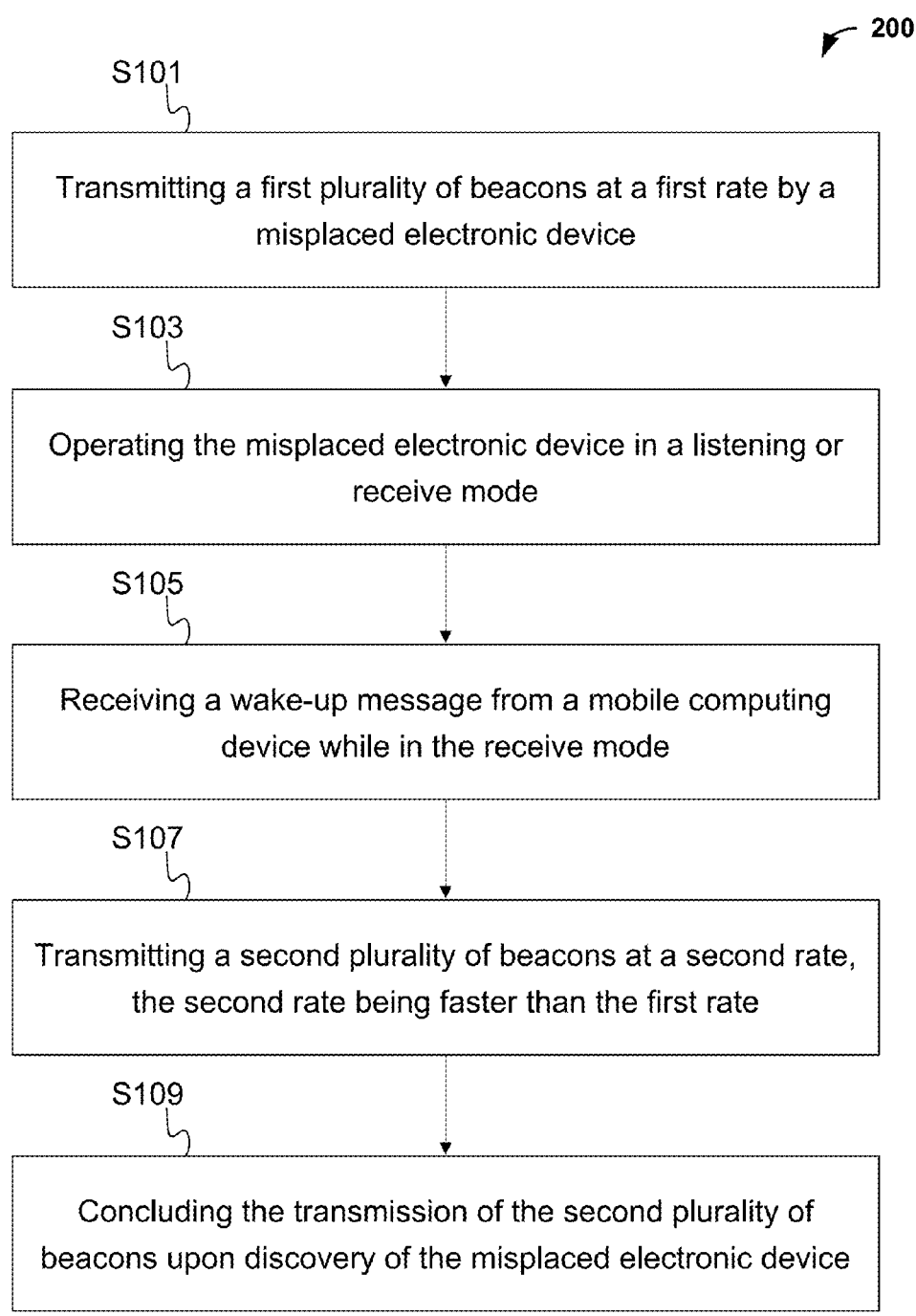
FIG. 2 is a flow diagram of a method of reconnecting a misplaced electronic device with a mobile computing device.

FIG. 2 depicts an exemplary method 200 for reconnecting a misplaced electronic device with a mobile computing device. In act S101, a first plurality of beacons is transmitted by the misplaced electronic device. The beacon transmissions may be accomplished using an integrated circuit of the electronic device. The first plurality of beacons may be transmitted at a first rate, with each beacon being transmitted over a defined period of time. Specifically, each beacon in the first plurality of beacons may be transmitted at a first interval of time from an adjacent beacon in the first plurality of beacons. As noted above, the interval of time between beacons and the length of each beacon may be programmably adjustable.

In act S103, the electronic device is operated in a listening or receive mode between at least one pair of adjacent beacons in an effort to listen for and receive a message (e.g., a magic packet) from the paired mobile computer. Like the beaconing, the interval of time between operating in receive mode and the length of each receive mode operation is configurable based on certain characteristics of the electronic device.

In act S105, a wake-up message or magic packet is received from a mobile computing device over a wireless communication network during the operation in the listening or receive mode.

In act S107, following receiving the wake-up message, the electronic device transmits a second plurality of beacons. The second plurality of beacons may be transmitted at a second rate that is faster than the first rate, therein providing a hybrid beaconing arrangement. In other words, each beacon in the second plurality of beacons is transmitted at a second interval of time from an adjacent beacon in the second plurality of beacons, wherein the second interval of time is less than the first interval of time. The faster beaconing may be advantageous in discovering the misplaced device in less time than if the beaconing rate remained at the first rate.

In act S109, following discovery of the misplaced electronic device by the mobile computing device (such as when the two devices are within a threshold distance or have at least a threshold received signal strength level), the rapid beaconing stops. This is advantageous in conserving battery life.

Exemplary Method of Discovering an Electronic Device Using a Mobile Computer

Figure 3:
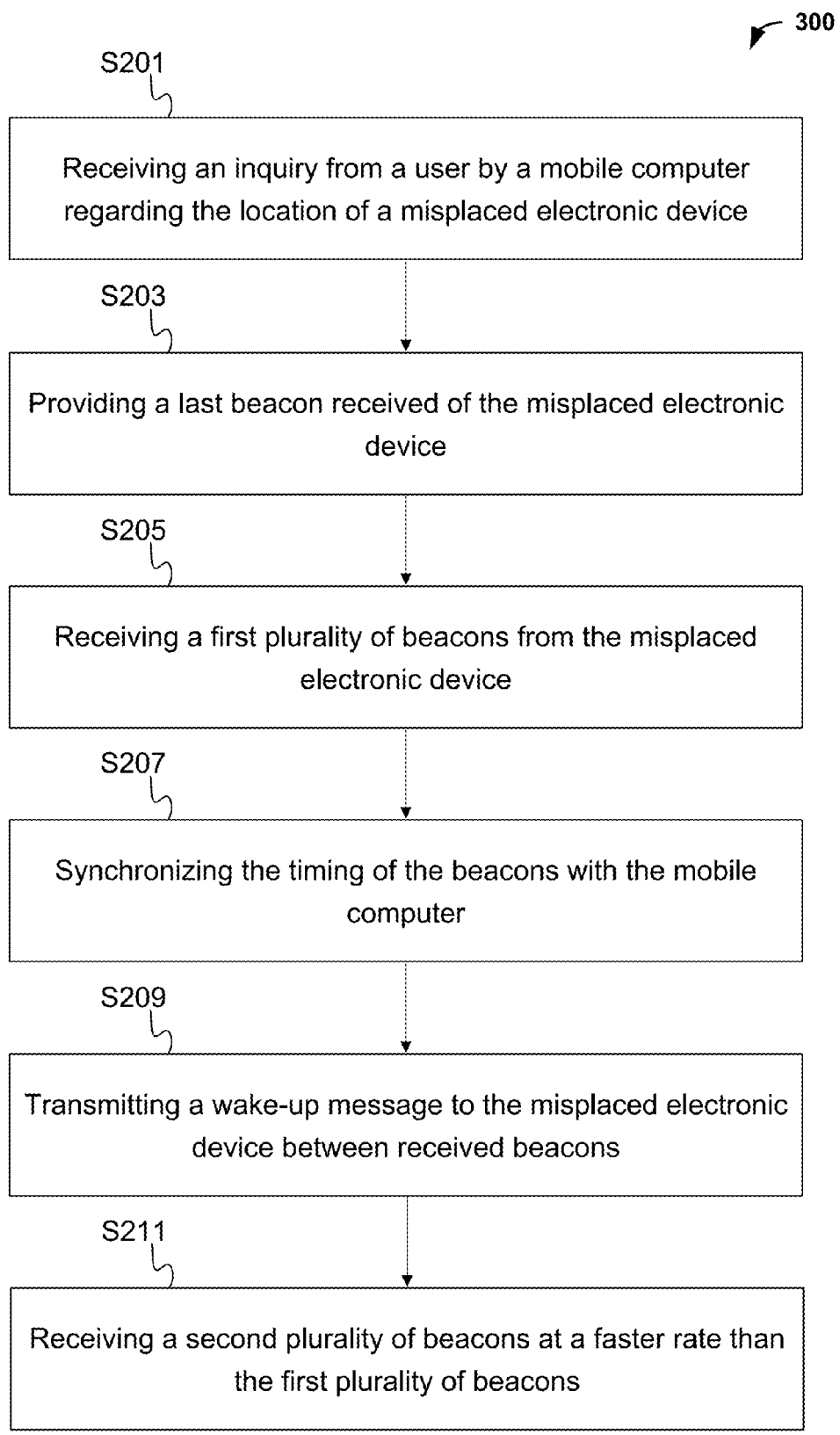
FIG. 3 is a flow diagram of a method of finding a misplaced electronic device using a mobile computing device.

FIG. 3 depicts an exemplary method 300 of discovering an electronic device using a mobile computing device. In act S201, the mobile computing device receives an inquiry from a user of the device requesting assistance in locating the misplaced electronic device. The inquiry may be a verbal inquiry by the user (e.g., "Where's my pen?") or the user may physically input the inquiry into the mobile computer (e.g., via a touchscreen display of the computer).

In act S203, the mobile computing device provides information regarding a last beacon received from the misplaced electronic device. The last beacon received may be the most recent beacon stored in the memory of the mobile computing device prior to a loss of connection between the misplaced electronic device and the mobile computing device. This may include a timestamp and/or location information, aiding the user in retracing his or her steps to the potential location of the misplaced device.

In act S205, after the mobile computing device is moved into a vicinity of the misplaced electronic device, the mobile computing device receives a first plurality of beacons from the misplaced electronic device. The first plurality of beacons may be received at a first rate. In other words, each beacon in the first plurality of beacons may be received at a first interval of time from an adjacent beacon in the first plurality of beacons.

In act S207, the mobile computer acknowledges that a connection has been made with the misplaced device based on the receipt of the first plurality of beacons. The mobile computer performs a synchronization act. In this synchronization, the mobile computer identifies the timing of each received beacon from the misplaced device. Using this timing information, the mobile computer may determine when to transmit a message to the misplaced device such that the message is sent at a time between beacons when the misplaced device may be operating in a listening or receive mode.

In act S209, at least one wake-up message is transmitted by the mobile computing device to the misplaced electronic device over a wireless communication network (e.g., a Bluetooth low energy network). The transmission of the wake-up message may be completed using a processor of the mobile computing device. Based upon the synching of the devices, the wake-up message is configured to be transmitted between at least one pair of adjacent beacons, wherein the misplaced electronic device may be operating in a listening or receive mode.

In act S211, following receipt of the wake-up message by the misplaced electronic device, a second plurality of beacons may be received by the mobile computing device from the electronic device. The second plurality of beacons may be received at a second rate that is faster than the first rate. In other words, each beacon in the second plurality of beacons is received at a second interval of time from an adjacent beacon in the second plurality of beacons, wherein the second interval is less than the first interval.

Figure 4:
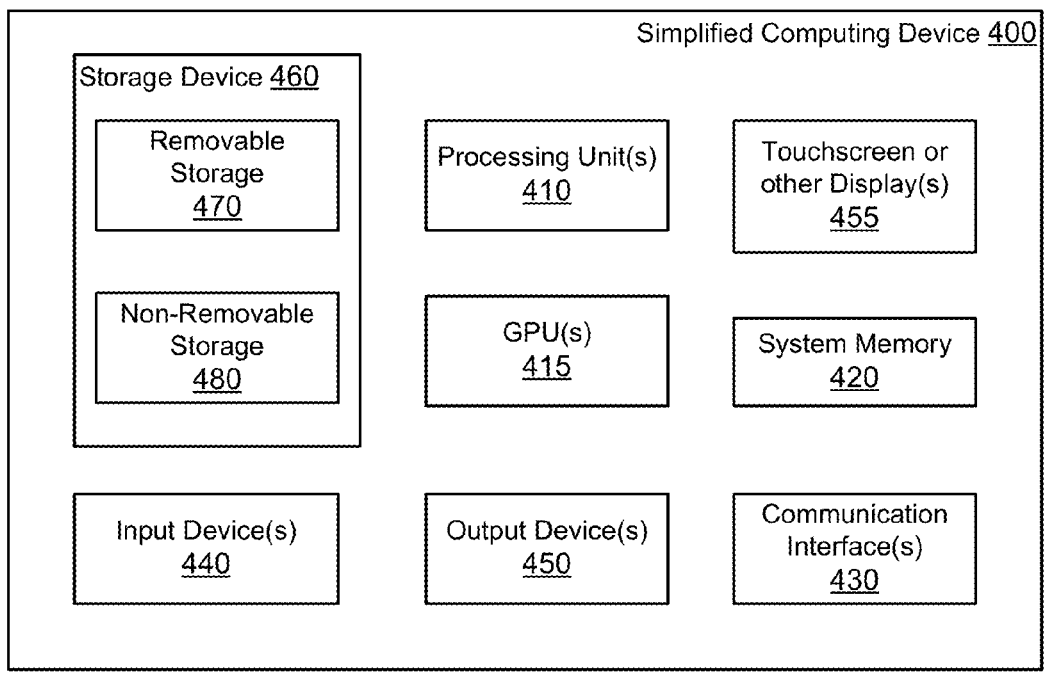
FIG. 4 is a block diagram of a computing environment in accordance with one example for implementation of the disclosed methods or one or more electronic devices.

Exemplary Computing Environment of the Mobile Computer or its Paired Electronic Device With reference to FIG. 4, the mobile computer or the paired/misplaced electronic device as described above may be incorporated within an exemplary computing environment 400. The computing environment 400 may correspond with one of a wide variety of electronic devices defined above.

The computing environment 400 has sufficient computational capability and system memory to enable basic computational operations. In this example, the computing environment 400 includes one or more processing unit(s) 410, which may be individually or collectively referred to herein as a processor or integrated circuit. The computing environment 400 may also include one or more graphics processing units (GPUs) 415. The processor 410 and/or the GPU 415 may include integrated memory and/or be in communication with system memory 420. The processor 410 and/or the GPU 415 may be a specialized microprocessor, such as a digital signal processor (DSP), a very long instruction word (VLIW) processor, or other microcontroller, or may be a general-purpose central processing unit (CPU) having one or more processing cores. The processor 410, the GPU 415, the system memory 420, and/or any other components of the computing environment 400 may be packaged or otherwise integrated as a system on a chip (SoC), application-specific integrated circuit (ASIC), or other integrated circuit or system.

The computing environment 400 may also include other components, such as, for example, a communications interface 430. One or more computer input devices 440 (e.g., pointing devices, keyboards, audio input devices, video input devices, haptic input devices, or devices for receiving wired or wireless data transmissions) may be provided. The input devices 440 may include one or more touch-sensitive surfaces, such as a track pad. Various output devices 450, including touchscreen or touch-sensitive display(s) 455, may also be provided. The output devices 450 may include a variety of different audio output devices, video output devices, and/or devices for transmitting wired or wireless data transmissions.

The computing environment 400 may also include a variety of computer readable media for storage of information such as computer-readable or computer-executable instructions, data structures, program modules, or other data. Computer readable media may be any available media accessible via storage devices 460 and includes both volatile and nonvolatile media, whether in removable storage 470 and/or non-removable storage 480. Computer readable media may include computer storage media and communication media. Computer storage media may include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 400.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

Claim Support Section

In a first embodiment, a method comprises transmitting a first plurality of beacons, by a circuit of an electronic device, wherein each beacon in the first plurality of beacons is transmitted at a first interval of time from an adjacent beacon in the first plurality of beacons; operating the electronic device in a receive mode between at least one pair of adjacent beacons; receiving a wake-up message during the operation in the receive mode; and transmitting a second plurality of beacons following receiving the wake-up message, wherein each beacon in the second plurality of beacons is transmitted at a second interval of time from an adjacent beacon in the second plurality of beacons, wherein the second interval is less than the first interval.

In a second embodiment, an electronic device comprises at least one processor; and at least one memory including computer program code for one or more programs; the at least one memory and the computer program code configured to, with the at least one processor, cause the electronic device to at least perform: (1) transmit a first plurality of beacons, wherein each beacon in the first plurality of beacons is transmitted at a first interval of time from an adjacent beacon in the first plurality of beacons; (2) operate in a receive mode between at least one pair of adjacent beacons; (3) receive a wake-up message during the operation in the receive mode; and (4) transmit a second plurality of beacons following receipt of the wake-up message, wherein each beacon in the second plurality of beacons is transmitted at a second interval of time from an adjacent beacon in the second plurality of beacons, wherein the second interval is less than the first interval.

In a third embodiment, with reference to the first or second embodiment, each beacon in the first plurality of beacons comprises a timestamp and a location indicator.

In a fourth embodiment, with reference to the third embodiment, the location indicator is an access point of the electronic device.

In a fifth embodiment, with reference to any of embodiments 1-4, each beacon in the second plurality of beacons comprises a received signal strength indicator.

In a sixth embodiment, with reference to any of embodiments 1-5, the electronic device is a stylus.

In a seventh embodiment, with reference to any of embodiments 1-6, the electronic device is a wearable electronic device.

In an eighth embodiment, with reference to any of embodiments 1-7, the wake-up message is received via a Bluetooth low energy communication network.

In a ninth embodiment, with reference to any of embodiments 1-8, the method further comprises or the electronic device further performs concluding the transmitting of the second plurality of beacons when the electronic device is discovered or when the electronic device is within a threshold range of a mobile computing device.

In a tenth embodiment, a method comprises receiving a first plurality of beacons, each beacon in the first plurality of beacons is received at a first interval of time from an adjacent beacon in the first plurality of beacons; transmitting, by a processor of a mobile computing device, a wake-up message between at least one pair of adjacent beacons; and receiving a second plurality of beacons, wherein each beacon in the second plurality of beacons is received at a second interval of time from an adjacent beacon in the second plurality of beacons, wherein the second interval is less than the first interval.

In an eleventh embodiment, a mobile computing device comprises at least one processor; and at least one memory including computer program code for one or more programs; the at least one memory and the computer program code configured to, with the at least one processor, cause the mobile computing device to at least perform: (1) receive a first plurality of beacons, wherein each beacon in the first plurality of beacons is received at a first interval of time from an adjacent beacon in the first plurality of beacons; (2) transmit a wake-up message between at least one pair of adjacent beacons; and (3) receive a second plurality of beacons, wherein each beacon in the second plurality of beacons is received at a second interval of time from an adjacent beacon in the second plurality of beacons, wherein the second interval is less than the first interval.

In a twelfth embodiment, with reference to the tenth or eleventh embodiment, the mobile computing device is selected from the group consisting of: a laptop computer, a tablet computer, a mobile phone, a music device, a handheld gaming device, a navigation device, and a wearable electronic device.

In a thirteenth embodiment, with reference to any of embodiments 10-12, the method further comprises or the mobile computing device further performs, prior to receiving the first plurality of beacon signals: receiving an inquiry from a user of the mobile computing device regarding a location of the electronic device; and providing information from a last beacon received from an electronic device prior to a loss of connection between the electronic device and the mobile computing device.

In a fourteenth embodiment, with reference to the thirteenth embodiment, the inquiry from the user is a verbal inquiry.

In a fifteenth embodiment, with reference to any of embodiments 10-14, the method further comprises or the mobile computing device further performs, prior to transmitting a wake-up message: receiving a beacon signal comprising a received signal strength indicator; identifying that the received signal strength indicator is below a threshold value; and providing a notification, by the processor of the mobile computing device, that the received signal strength indicator is below the threshold value.

In a sixteenth embodiment, with reference to any of embodiments 10-15, the method further comprises or the mobile computing device further performs synchronizing the mobile computing device with a timing of the first plurality of beacons such that the wake-up message is transmitted between the at least one pair of adjacent beacons.

In a seventeenth embodiment, with reference to any of embodiments 10-16, the wake-up message is transmitted via a Bluetooth low energy communication network.

What is claimed is:

1. A method comprising:
    transmitting a first plurality of beacons, by a circuit of an electronic device, wherein each beacon in the first plurality of beacons is transmitted at a first interval of time from an adjacent beacon in the first plurality of beacons;
    operating the electronic device in a receive mode between at least one pair of adjacent beacons;
    receiving, by the electronic device, a wake-up message during the operation in the receive mode; and
    transmitting a second plurality of beacons following receiving the wake-up message, wherein the second plurality of beacons is separate from and follows the first plurality of beacons, wherein each beacon in the second plurality of beacons is transmitted at a second interval of time from an adjacent beacon in the second plurality of beacons, and wherein the second interval is less than the first interval; and
    identifying the location of the electronic device using the received second plurality of beacons.

2. The method of claim 1, wherein each beacon in the first plurality of beacons comprises a timestamp and a location indicator.

3. The method of claim 2, wherein the location indicator is an access point of the electronic device.

4. The method of claim 1, wherein each beacon in the second plurality of beacons comprises a received signal strength indicator.

5. The method of claim 1, wherein the electronic device is a stylus.

6. The method of claim 1, wherein the electronic device is a wearable electronic device.

7. The method of claim 1, wherein the wake-up message is received via a Bluetooth low energy communication network.

8. The method of claim 1, further comprising:
concluding the transmitting of the second plurality of beacons when the electronic device is discovered or when the electronic device is within a threshold range of a mobile computing device.

9. A method for identifying a location of an electronic device, the method comprising:
receiving a first plurality of beacons from the electronic device, wherein each beacon in the first plurality of beacons is received at a first interval of time from an adjacent beacon in the first plurality of beacons;
transmitting, by a processor of a mobile computing device, a wake-up message between at least one pair of adjacent beacons;
receiving a second plurality of beacons from the electronic device, wherein the second plurality of beacons is separate from and follows the first plurality of beacons, wherein each beacon in the second plurality of beacons is received at a second interval of time from an adjacent beacon in the second plurality of beacons, and wherein the second interval is less than the first interval; and
identifying the location of the electronic device using the received second plurality of beacons.

10. The method of claim 9, wherein the mobile computing device is selected from the group consisting of: a laptop computer, a tablet computer, a mobile phone, a music device, a handheld gaming device, a navigation device, and a wearable electronic device.

11. The method of claim 9, further comprising, prior to receiving the first plurality of beacon signals:
receiving an inquiry from a user of the mobile computing device regarding a location of the electronic device; and
providing information from a last beacon received from an electronic device prior to a loss of connection between the electronic device and the mobile computing device.

12. The method of claim 11, wherein the inquiry from the user is a verbal inquiry.

13. The method of claim 9, further comprising, prior to transmitting a wake-up message:
receiving a beacon signal comprising a received signal strength indicator;
identifying that the received signal strength indicator is below a threshold value; and
providing a notification, by the processor of the mobile computing device, that the received signal strength indicator is below the threshold value.

14. The method of claim 9, further comprising:
synchronizing the mobile computing device with a timing of the first plurality of beacons such that the wake-up message is transmitted between the at least one pair of adjacent beacons.

15. An electronic device comprising:
at least one processor; and
at least one memory including computer program code for one or more programs; the at least one memory and the computer program code configured to, with the at least one processor, cause the electronic device to at least perform:
transmit a first plurality of beacons, wherein each beacon in the first plurality of beacons is transmitted at a first interval of time from an adjacent beacon in the first plurality of beacons;
operate in a receive mode between at least one pair of adjacent beacons;
receive a wake-up message during the operation in the receive mode; and
transmit a second plurality of beacons following receipt of the wake-up message, wherein the second plurality of beacons is separate from and follows the first plurality of beacons, wherein each beacon in the second plurality of beacons is transmitted at a second interval of time from an adjacent beacon in the second plurality of beacons, and wherein the second interval is less than the first interval; and
identifying the location of the electronic device using the received second plurality of beacons.

16. The electronic device of claim 15, wherein the electronic device is a stylus or a wearable electronic device.

17. The electronic device of claim 15, wherein each beacon in the first plurality of beacons comprises a timestamp and a location indicator.

18. The electronic device of claim 15, wherein each beacon in the second plurality of beacons comprises a received signal strength indicator.

19. A mobile computing device comprising:
at least one processor; and
at least one memory including computer program code for one or more programs; the at least one memory and the computer program code configured to, with the at least one processor, cause the mobile computing device to at least perform:
receive a first plurality of beacons from an electronic device, wherein each beacon in the first plurality of beacons is received at a first interval of time from an adjacent beacon in the first plurality of beacons;
transmit a wake-up message between at least one pair of adjacent beacons;
receive a second plurality of beacons from the electronic device following transmission of the wake-up message, wherein the second plurality of beacons is separate from and follows the first plurality of beacons, wherein each beacon in the second plurality of beacons is received at a second interval of time from an adjacent beacon in the second plurality of beacons, and wherein the second interval is less than the first interval; and
identify a location of the electronic device using the received second plurality of beacons.

20. The mobile computing device of claim 19, wherein the mobile computing device is selected from the group consisting of: a laptop computer, a tablet computer, a mobile phone, a music device, a handheld gaming device, a navigation device, and a wearable electronic device.

21. The mobile computing device of claim 19, wherein the wake-up message is transmitted via a Bluetooth low energy communication network.

* * * * *